United States Patent [19]

Kirkbride et al.

[11] Patent Number: 5,446,883
[45] Date of Patent: Aug. 29, 1995

[54] METHOD AND SYSTEM FOR DISTRIBUTED INFORMATION MANAGEMENT AND DOCUMENT RETRIEVAL

[75] Inventors: Louise Kirkbride, Monte Sereno; Todd Eisemann, Santa Clara, both of Calif.

[73] Assignee: Answer Systems, Inc., Sunnyvale, Calif.

[21] Appl. No.: 965,165

[22] Filed: Oct. 23, 1992

[51] Int. Cl.⁶ ............................................... G06F 12/00
[52] U.S. Cl. ................. 395/600; 395/200.01; 364/DIG. 1; 364/282.1; 364/284.3
[58] Field of Search ............................. 395/600, 200; 364/DIG. 1

[56] References Cited

U.S. PATENT DOCUMENTS

| | | | |
|---|---|---|---|
| 4,714,992 | 12/1987 | Gladney et al. | 364/200 |
| 4,876,643 | 10/1989 | McNeill | 364/200 |
| 5,109,486 | 4/1992 | Seymour | 395/200 |
| 5,179,660 | 1/1989 | Devany et al. | 395/200 |
| 5,253,361 | 10/1993 | Thurman et al. | 395/600 |
| 5,287,505 | 2/1994 | Calvert et al. | 395/600 |
| 5,287,537 | 2/1994 | Newmark et al. | 395/800 |
| 5,293,250 | 3/1994 | Okumura et al. | 358/402 |
| 5,301,314 | 4/1994 | Gifford et al. | 395/600 |
| 5,333,317 | 7/1994 | Dann | 395/600 |

Primary Examiner—Thomas G. Black
Assistant Examiner—Jean R. Homere
Attorney, Agent, or Firm—Fenwick & West

[57] ABSTRACT

A distributed computer system and method for integrating call management to the retrieval of documents in response to user inquiries includes distributed computers, a processor connected to an incident table register, a user table register and an acyclic graph data base. The incident table register records and stores information related to the user inquiry, the user table stores information related to the user's identity and the acyclic graph data base stores a plurality of documents useful in addressing user inquiries. Within a top level of the acyclic graph data base are indices for importing and exporting documents to remote inquiry systems for the purpose of escalating inquiry problems to other systems having more specialized knowledge.

13 Claims, 6 Drawing Sheets

METHOD AND SYSTEM FOR DISTRIBUTED INFORMATION MANAGEMENT AND DOCUMENT RETRIEVAL

BACKGROUND OF THE INVENTION

1. Field of the Invention

This invention relates to heuristic learning application programs and more particularly to a method for entering user-specific problems and for heuristically retrieving documented solutions among multiple distributed computer management systems.

2. Description of the Background Art

A recurring problem among users of expert systems arises when multiple systems are employed in solving a common set of problems. Traditionally, expert systems are used to solve recurring problems by applying a set of either known or learned rules to a common set of problem characteristics. As new problems develop, responses to these problems are designed and installed on the system. Use of a single expert system is often cumbersome, particularly when users are located in remote sites. For example, a set of users in the United States would have difficulty sharing an expert system with users in Japan. This difficulty would be particularly acute if the two groups commonly faced diverging sets of problems and if the expert systems were programmed to respond in languages native to only one of the two groups. Furthermore, the telecommunications costs associated with the use by the Japanese of the U.S. installation (or vice versa) might be greater than the costs of installing a similar expert system in Japan.

The use of two separate systems, however, presents its own set of challenges. If the separate groups are organizationally related, it may be useful or important for the two expert systems to be able to cooperate and share selected information. One approach to the sharing of information is to synchronize the two data bases so that any solution developed in the Japanese data base, for instance, would correspondingly appear in the U.S. data base. However, due to the administrative costs of synchronizing data bases, and the fact that some solutions common to Japanese problems may not be required in the U.S. expert system data base, total synchronization is generally impractical. What is needed, then, is a way to selectively share information on an as-needed basis. This sharing of information would occur when one data base receives a problem for which it does not have a solution, and for which an associated data base is positioned to more efficiently solve. The first data base might then escalate the problem to the second data base which would solve the problem and then return a solution to the first. Such a system would be capable of selectively transferring problems, solutions, and useful information efficiently between data bases.

SUMMARY OF THE INVENTION

In accordance with the present invention, a system (9) and method for distributed call management and document retrieval is shown. The system (9) includes multiple expert or inquiry computers (10) connected using a networking scheme such as a modem or other communication link. Each inquiry computer (10) contains a processor (11), a plurality of specially configured registers, and a memory array comprising an acyclic graph data base (27). The computers (10) transfer problems to each other using a selective protocol which imports problems, identifies or creates document solutions and exports the solutions to the originating computer (10). According to the method of the present invention, a problem is logged into the inquiry computer (10) and a search for a solution document is undertaken. If no solution document is found, a problem report is then created and posted into a document. The document may be escalated to a remote inquiry computer by placing it in an export index (42), wherein the problem may be solved and a solution automatically sent electronically to the original user.

DESCRIPTION OF THE PREFERRED EMBODIMENT

Figure 1:
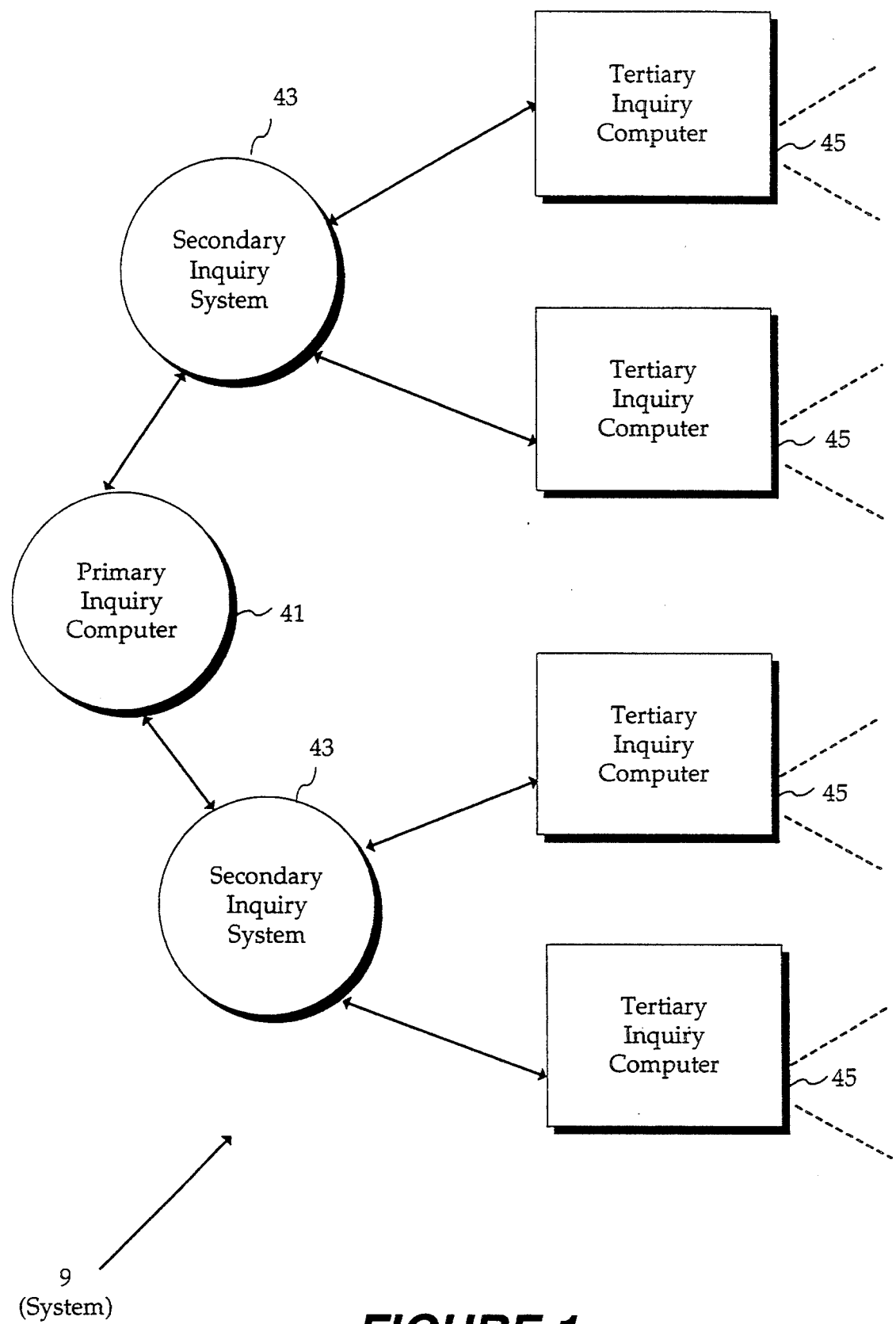
FIG. 1 is a block diagram showing distributed information system 9 in a preferred configuration having a primary inquiry computer 41 connected to a plurality of secondary and lower order computers.

A preferred block diagram of the distributed information management and document retrieval system 9 of the present invention is shown in FIG. 1. Primary inquiry computer 41 is shown connected to a pair of secondary computer systems 43, which are in turn shown further connected to a plurality of tertiary inquiry computers 45. Under the structure of the present invention, tertiary inquiry computers 45 could further contain additional subsidiary inquiry computers. An alternative embodiment might contain networking schemes in which each of the inquiry computers 10 are connected to other inquiry computers. This connection to other computers may be in a ring network configuration, a star network configuration, or a combined network embodying both ring and star Characteristics, rather than in the modified tree structure of FIG. 1.

Figure 2:
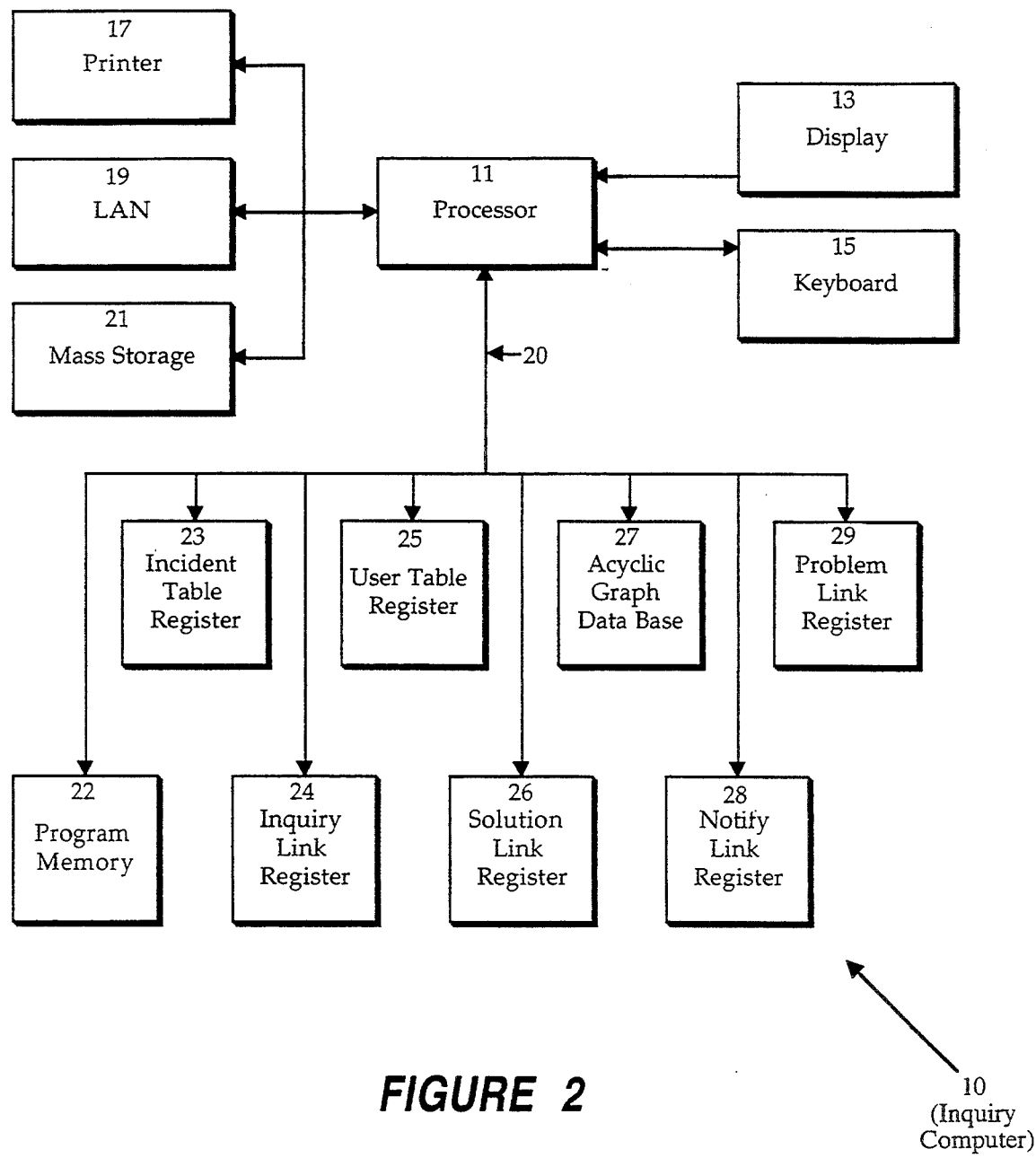
FIG. 2 is a schematic diagram showing the preferred embodiment of inquiry computer 10 of the present invention.

Referring now to FIG. 2, the preferred embodiment of inquiry computer 10 is shown. The preferred embodiment of inquiry computer 10 of the present invention is implemented on a general purpose, microprocessor based, computer such as a Sun Microsystems, IBM, or Hewlett-Packard computer. Inquiry computer 10 is maintained and operated by a system administrator who is at least somewhat knowledgeable about the subject matter being supported, as well as the computer hardware and associated software. The system administrator is able to change the structure and model of system 9 as needed. In addition to the system manager, there is at least one data owner who is knowledgeable about various solution documents, but who is not charged with operation or maintenance of inquiry computer 10 and its hardware components. Finally, there may also be support engineers, who may enter incidents, but do not enter solutions or maintain the system.

Inquiry computer 10 of the present invention is shown having processor 11 which is connected to keyboard 15 and display 13. Keyboard 15 and display 13 enable a user to interact with processor 11 by entering data and viewing the displayed contents of various memories. Also connected to processor 11 are printer 17, mass storage 21, and Local Area Network (LAN) 19. Printer 17 enables the user to make a permanent record of the various memory contents. Mass storage 21 is useful for long term storage and for maintaining large quantities of data. Local area network 19 enables the user to exchange data files and to interact with the memories and processors of other computer systems, as described in more detail below. Connection to an alternative Wide Area Network (WAN), is also possible, for serving a geographic area larger than that served on a traditional LAN 19.

Figure 3:
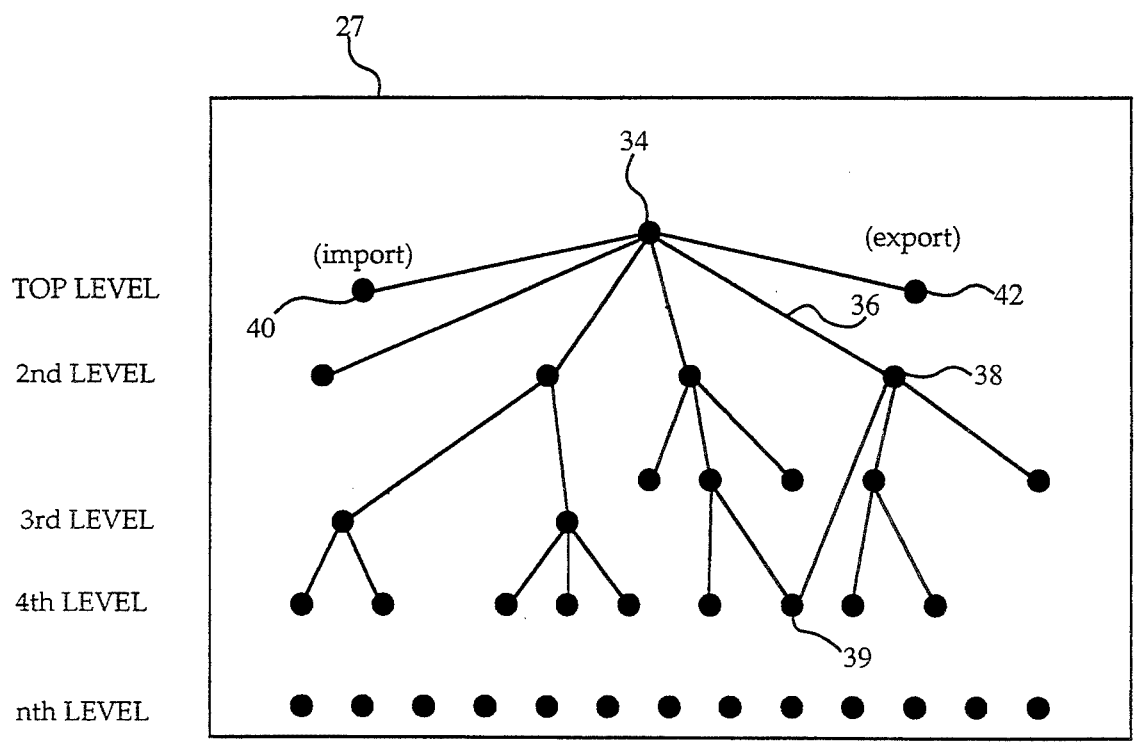
FIG. 3 is a schematic diagram showing various document levels within acyclic graph data base 27 of the present invention.

Connected to inquiry computer 10 by data bus 20 are a plurality of special purpose memories and registers which are utilized by processor 11 in executing programming steps which are resident in program memory 22. Acyclic graph data base 27 contains a collection of documents designed to 5provide assistance to users who log inquiries into the system. As in a traditional expert system, the user logs onto computer 10 and presents a problem or incident to be solved by a document resident in the system. Rather than stating the problem as a series of answers to questions posed by the machine, as in the classical expert environment, the user searches a sequence of indices at various nodes in an acyclic graph. This acyclic graph data base 27 structure can be more clearly understood by referring to FIG. 3. Data base 27 has a first or top level 34 which contains a list of documents which might be useful in solving common user problems. In addition to the list of documents is a menu of sub-indices from which the user can choose to search an additional, more narrowly focused list of documents. If a sub-index from the menu is chosen, the user will move along path 36 to a second level node 38 containing a new list of documents and a new list of sub-indices. The search can be continued in this manner, descending through N levels until the desired document is found. Acyclic graph data base 27 may contain links connecting lower levels to higher levels, as well as vice versa, so long as the overall structure precludes an endless loop. Thus, as in FIG. 3, node 39 may be connected to node 38, allowing a search to proceed from the fourth level back up to the second level.

Acyclic graph data base 27 contains two indices in top level node 34, specifically for communicating with other inquiry computers 10. These two indices are import index 40 and export index 42. These indices will be discussed in further detail below.

Referring now to FIG. 2, incident table register 23, user table register 25, inquiry link register 24, solution link register 26, acyclic graph data base 27, notify link :register 28 and problem link register 29 are also connected to data bus 20. Incident table register 23 includes an array of memory elements containing records of all user inquiries. Each time a user accesses inquiry computer 10 to enter a problem, the system logs and stores, in problem report register 29, the incident and the search steps performed by the user in search of the documented solution. User table register 25 includes a list of all authorized users of inquiry computer 10. This user table register 25 contains such information as the user's name, company affiliation, address, phone number and other personal information related to the user's history or circumstances.

Inquiry link register 24 stores the mapping or link between the incident table register 23 and user table register 25. When the user logs onto computer 10, inquiry link register 24 records the location in user table register 25 pointing to the user's identification and attaches to that pointer an address relating to the location in incident table register 23 corresponding to the incident. This inquiry link provides important correspondence between the user and the user inquiry. Using this correspondence link, the system administrator is able to track the ongoing problems of each user and is able to use this information to organize solution documents to assist users with problems. This information also enables the user to be notified when new solution documents to a given incident are generated.

Solution link register 26 is similar in structure to inquiry link register 24, except that each record in incident table register 23 relating to the present inquiry is mapped to a document solution in acyclic graph data base 27. More than one inquiry may be mapped to a given document solution. This linkage or mapping between incident and solution allows the administrator to monitor the effectiveness of acyclic graph data base 27 and to perform updates and maintenance on specific documents based on usage.

Notify link register 28 records the mapping between user table register 25 and the incident solution in acyclic graph data base 27. This linkage maintains a list of all users who have an interest in a specific document, enabling notification of users when a change or update to the document is created. Problem link register 29 connects the contents of incident table register 23 to corresponding solution documents in acyclic graph data base 27. This linkage is useful to the system administrator for showing which solution documents were retrieved for various incidents or problems posed to inquiry computer 10. One example of the use of this linkage would be if a non-optimal solution document was continually being retrieved for a recurring problem or incident. Recognizing this pattern from the data stored in problem link register 29, the data owner could take action to either improve the solution document or restructure acyclic graph paths 36 so that a more useful solution to the given problem is found.

As problems arise that cannot be solved within the administrative structures of local inquiry computer 10, the system administrator may choose to escalate or transfer these problem documents to an alternate location for solution. In the preferred embodiment, this escalation would typically occur between secondary computer 43 (or lower order computer), which would create the originating problem document and primary system 41 (or other higher order computer). Physical transfer of this unsolved problem document occurs by linking the problem document to export index 42. Periodically, processor 11 checks all of the documents linked to export index 42 and batch dumps these export documents to a transfer file which is reformatted and sent to the primary system 41 through local area network 19, or alternatively a WAN.

Figure 4:
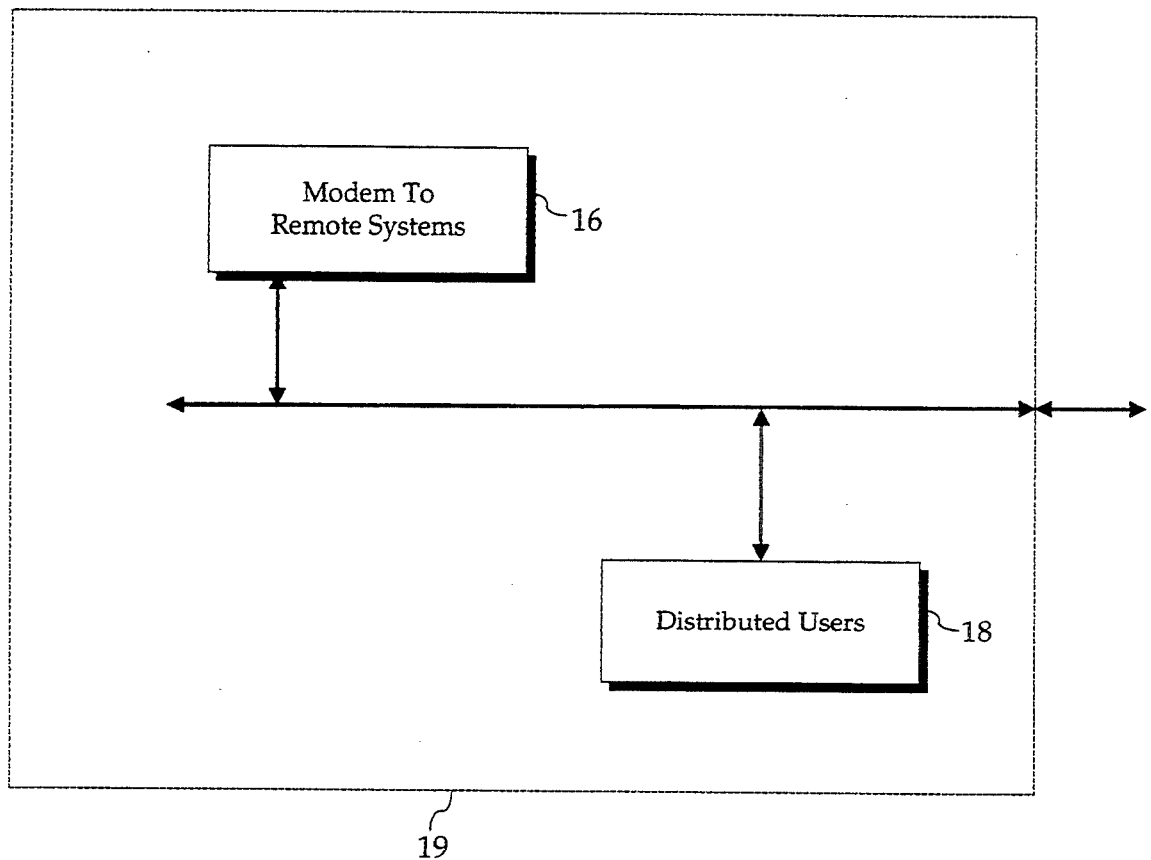
FIG. 4 is a block diagram showing the contents of local area network 19 of the present invention.

Referring now to FIG. 4, a block diagram of local area network 19 is shown comprising modem 16 and other distributed users 18. Modem 16 is a standard telephone modem which connects the processor to a T-1 phone line or other communications line. The block connecting distributed users block 18 represents the connection of multiple users to processor 11 through a local network system such as EtherNet.

Figure 5:
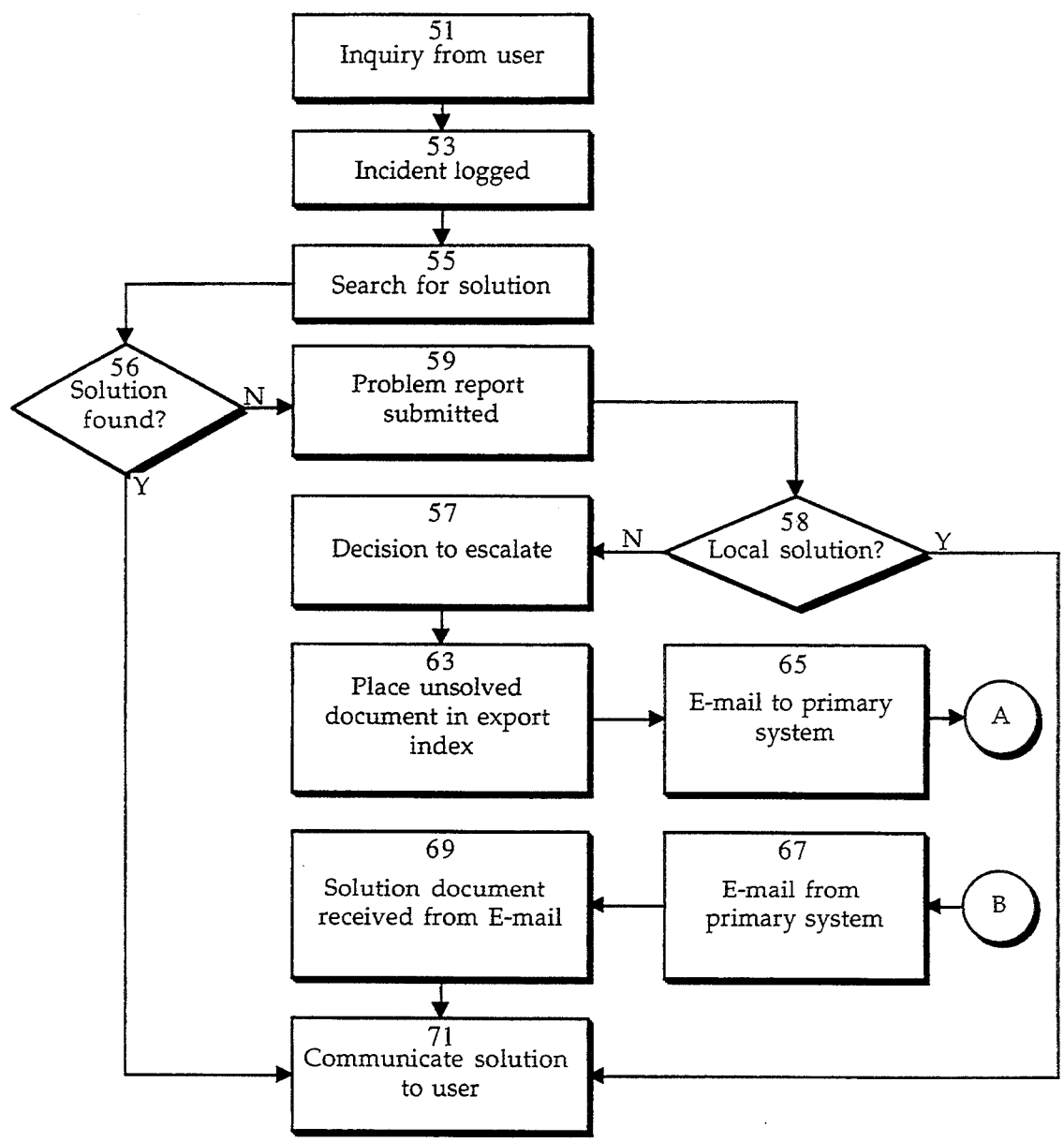
FIG. 5 is a block diagram showing the steps implemented in secondary inquiry computer 43 of the present invention.

Referring now to FIG. 5, a block diagram shows the steps of a method employing the secondary inquiry computer 43 of the present invention. This method begins with the user making an inquiry of computer 43 in step 51. To illustrate the method, assume that the user is the purchaser of a new toaster who has a problem with burned toast and that computer 43 is being administered by a local representative of the toaster manufacturer. The user makes inquiry into computer 43, either directly or more likely through the representative. In step 53, the incident (burned toast complaint) is logged into inquiry computer 43 through keyboard 15. Information relating to the burned toast complaint is stored in incident table register 23 by processor 11. At the time of the initial inquiry, processor 11 creates an inquiry record link and stores this link into inquiry link register 24.

In step 55, the user (or support representative) begins the search of acyclic graph data base 27 for a document relating to the subject of burned toast. The top level node 34 is first searched for subjects related to the problem, e.g., making toast. The user will then follow path 36 to a second level node 38, where a document related to the incident might be found and read. Such a document might be titled "What to Do When the Toaster Burns the Toast," which suggests moving the toasting time indicator to a lighter setting. If this document solves the incident (step 56), the user can optionally print the document on printer 17. If the support representative is operating computer 43 on behalf of the user, the support representative will then notify the user of the solution in step 71. If in step 56, no solution document is found, a problem report is then generated and submitted to a local toaster expert (also employed by the toaster manufacturer) to review in step 59. The toaster expert will attempt to locate a solution document within acyclic graph data base 27, and if a document is found, the structure of acyclic graph data base 27 may be modified to make the document more detectable. If no solution document is located, the toaster expert will use the problem report to try to generate a local solution to the incident in step 58. If a local solution is generated in step 58, the user is notified of the solution in step 71. If no solution is reached in step 59, a decision may be made to escalate the problem document in step 57, and thereby create a new problem report on primary system 41, which is maintained by the toaster manufacturer. In order to create the problem report, the unsolved document on secondary system 43 is linked to export index 42 in step 63. The accumulation of documents are batch-shipped to the primary system using standard electronic techniques in step 65. They are then converted into problem reports in primary system 41 and linked to that system's import index.

Figure 6:
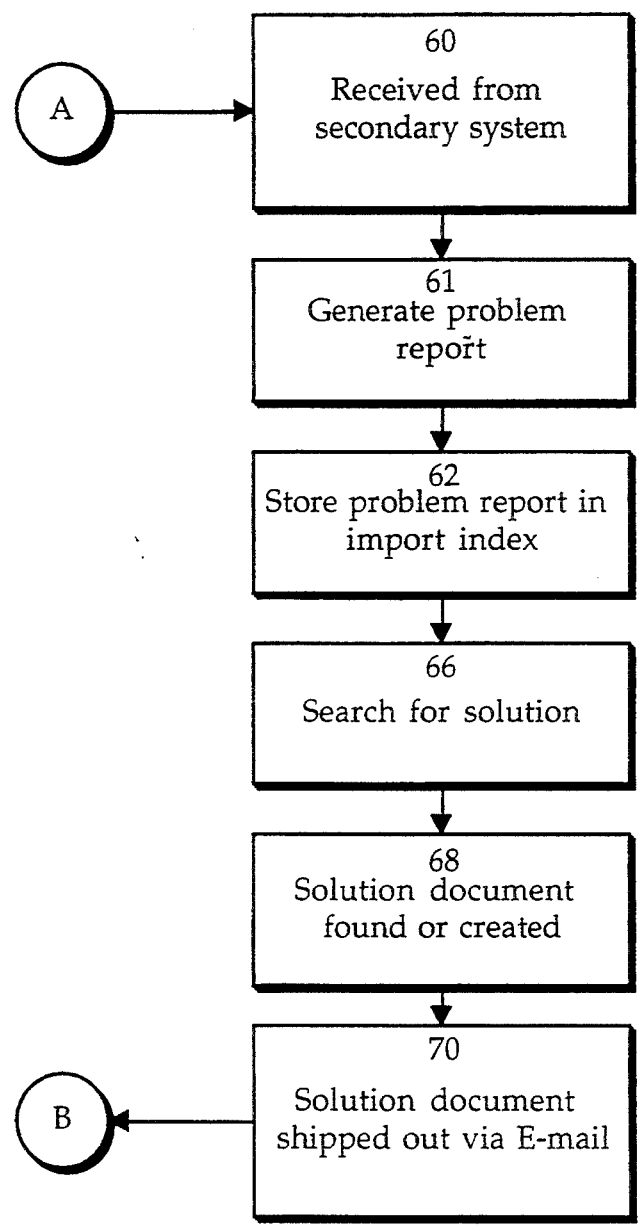
FIG. 6 is a block diagram showing the steps implemented in primary inquiry computer 41 of the present invention.

Referring now to FIG. 6, the flow chart of steps is shown which are processed within primary inquiry computer 41. In step 60, primary inquiry computer 41 receives a batch file of inquiry documents electronically. In step 61, it generates problem reports from these documents, and, in step 62, it stores these problem reports in import index 40. The receipt of these problem reports within index 40 of primary computer 41 is the equivalent of the inquiry step to secondary computer 43 which occurred in step 53. Within primary computer 41, a search is conducted for the solution document in step 66, in a manner similar to that which occurred in steps 55 and 56 of the secondary computer 43 flow chart shown in FIG. 5. The generation of the problem report within primary inquiry computer 41 is an important step in the overall process, since this problem report represents a linkage between the primary and secondary inquiry computers 41, 43. The problem report records the nature of the original user inquiry, the steps traced in secondary inquiry computer 43 to resolve the inquiry prior to receipt by primary inquiry computer 41, and the identity of secondary inquiry computer 43, to which a solution document must be returned. In step 68 of FIG. 6, the data owner at primary inquiry computer 41 will either find or create a solution document which solves the problem report generated from the document created on secondary inquiry computer 43. The solution document is shipped back to secondary inquiry computer via E-mail in step 70.

If no solution is found, it is possible for primary inquiry computer 41 to further escalate the problem report, assuming higher-order computers are available, in a manner similar to the escalation of the inquiry from secondary inquiry computer 43 in step 65. Once the solution document is received by secondary inquiry computer 43 in step 69, the solution can be communicated to the user in step 71.

We claim:

1. A method for retrieving a solution document in response to an inquiry from among a system of distributed data bases, the system having at least a first and a second computer, each computer having a data base of solution documents, the method comprising the steps of:

receiving at least one inquiry into the first computer, the inquiry having a subject;

searching the data base of the first computer for a solution document related to the subject of the inquiry;

responsive to finding at least one solution document in the data base of the first computer related to the subject of the inquiry, retrieving the solution document from the first computer;

responsive to finding no solution document in the data base of the first computer related to the subject of the inquiry, performing the steps of:

generating in the first computer, a document from at least one inquiry in the first computer for which no solution document was found, the document containing for each such inquiry the subject of the inquiry, and an identity of the computer in which the inquiry originated;

transmitting the document to the second computer;

extracting in the second computer any inquiries from the document;

for each extracted inquiry, searching the data base of the second computer for a solution document related to the subject of the inquiry;

responsive to finding at least one solution document in the data base of the second computer, retrieving the solution document from the second computer and exporting the solution document to the computer in which the inquiry originated; and, responsive to finding no solution document in the data base of the second computer, notifying the computer in which the inquiry originated that no solution document has been found.

2. The method of claim 1 wherein the data base of the first computer comprises top, second and lower levels of nodes, each node containing at least one subject index and at least one document index, each subject index connected by a path to at least one lower level node, each document index containing a list of documents, and wherein the step of searching the data base of the first computer for a solution document further comprises the steps of:

identifying in the top node of the data base at least one document or subject index related to the subject of the inquiry;

following the path of a subject index related to the subject of the inquiry to a second level node;

identifying in the second level node at least one document or subject index related to the subject of the inquiry; and following the paths of subject indices to other nodes until a document related to the subject of the inquiry is identified.

3. The method of claim 1, wherein the first computer has an export index as a data base node and the second computer has an import index as a data base node, wherein the step of transmitting the document to the second computer further comprises the steps of:

linking the document to the export node of the first computer; and transmitting the document to the second computer; and wherein the step of extracting any inquiries from the document further comprises the steps of:

storing the document in the import node of the second computer; and generating a problem report for each inquiry in the document in the import node of the second computer, each problem reporting containing an extracted inquiry.

4. The method of claim 1, wherein the step of exporting the solution document from the second to the first computer further comprises the step of:

generating a new solution document in the second computer related to the subject of the inquiry.

5. The method of claim 1, further comprising the steps of:

responsive to finding no solution document in the data base of the second computer related to the subject of the inquiry, performing the steps of:

generating a document from at least one inquiry in the second computer for which no solution document was found, the document containing for each such inquiry the subject of the inquiry, and further containing an identity of the computer in which the inquiry originated;

transmitting the document to at least one additional computer containing a data base of solution documents;

extracting in the additional computer any inquiries from the document;

for each extracted inquiry, searching the data base of the additional computer for a solution document related to the subject of the inquiry;

responsive to finding at least one solution document in the data base of the additional computer, retrieving the solution document from the additional computer and exporting the solution document to the computer in which the inquiry originated; and, responsive to finding no solution document in the data base of the additional computer, notifying the computer in which the inquiry originated that no solution document has been found.

6. The method of claim 1, wherein in each computer the data base of solution documents is organized in an acyclic graph.

7. The method of claim 1, wherein the computers are coupled by an electronic communications network, and where the steps of transmitting the document, and exporting the solution document further comprise the step of:

transmitting the document between the computers using the electronic communications network.

8. The method of claim 1, wherein the document generated in the first computer further contains for each inquiry at least one search step performed in searching the data base of the first computer for a solution document.

9. The method of claim 1, further comprising, responsive to finding no solution document in the data base of the first computer related to the subject of the inquiry, the step of:

generating a problem report describing the inquiry and at least one search step performed in searching the data base of the first computer for a solution document, wherein the document generated in the first computer is generated from the problem report.

10. A computer system for retrieving solution documents responsive to inquires from among a system of distributed computers, the system comprising:

a communications network coupled between the distributed computers;

a plurality of computers, each computer comprising:

a processor for receiving an inquiry;

an incident table coupled to the processor, the incident table storing the inquiry;

a document data base coupled to the processor and storing a plurality of solution documents, each solution document providing a solution to at least one inquiry in incident table;

an export index for storing at least one inquiry for communication to a second computer;

an import index for storing at least one inquiry received from another computer;

a search device coupled to the processor, and directed by the user for searching the document data base to retrieve a solution document providing a solution to an inquiry;

an escalation device, coupled to the search device, and placing an inquiry, for which no solution document is retrieved from the document data base by the search device, in the export index;

a communications device coupling the computer to the communications network, and coupled to the import and export indices, the communications device for transmitting at least one inquiry in the export index to another computer, and for receiving at least one inquiry from another computer and storing a received inquiry in the import index, wherein the search device searches the document data base for solutions to inquiries in the import index.

11. The system of claim 10, each computer further comprising:

a problem report table for storing a problem report including an inquiry received in the import index from a first computer, at least one search step used during a search of the document data base the first computer, and an identity of the first computer.

12. The system of claim 10, each computer further comprising:

a solution response device coupled to the communications device and the search device, to provide to the communications device a solution document retrieved by the search device in response to an inquiry in the import index, the inquiry received from a first computer, the communications device transmitting the solution document to the first computer.

13. The system of claim 10, wherein the database of each computer comprises a plurality of nodes, including a top node, at least one second level node, and a plurality of leaf nodes, each node including at least one solution document, the top and second level nodes each further including at least one subject index.

* * * * *

UNITED STATES PATENT AND TRADEMARK OFFICE
CERTIFICATE OF CORRECTION

PATENT NO. : 5,446,883
DATED : August 29, 1995
INVENTOR(S) : Louise Kirkbride and Todd Eisemann It is certified that error appears in the above-indentified patent and that said Letters Patent is hereby corrected as shown below:

Column 2, line 51, delete "Characteristics" and
       insert —characteristics—.
    Column 3, line 25, delete "5provide" and
       insert —provide—.
    Column 3, line 59, delete ":register" and insert
       insert —register—.
    Column 3, line 63, delete "enter" and
       insert —escalate—.
    Column 5, line 47, delete "59" and insert —58—.
    Column 5, line 67, delete "53" and insert —59—.

Signed and Sealed this

Twelfth Day of November, 1996

Attest:

BRUCE LEHMAN

Attesting Officer    Commissioner of Patents and Trademarks